United States Patent
Lo et al.

[19]

[11] Patent Number: 5,852,753

[45] Date of Patent: Dec. 22, 1998

[54] DUAL-LENS CAMERA WITH SHUTTERS FOR TAKING DUAL OR SINGLE IMAGES

[76] Inventors: Allen Kwok Wah Lo, 5022 Hidden Branches Dr., Dunwoody, Ga. 30338; Kenneth Quochuy Lao, 650 Glen Ave., Westfield, N.J. 07090

[21] Appl. No.: 964,196

[22] Filed: Nov. 10, 1997

[51] Int. Cl.[6] .................................................. G03B 41/00
[52] U.S. Cl. ........................... 396/323; 396/328; 396/471
[58] Field of Search ..................................... 396/323, 324, 396/326, 327, 328, 378, 471

[56] References Cited

U.S. PATENT DOCUMENTS 5,294,951  3/1994  Lo ........................................... 354/111
5,465,128  11/1995  Wah Lo et al. ........................... 354/114
5,581,314  12/1996  Yoneyama et al. ................. 396/323 X
5,678,088  10/1997  Fuss ......................................... 396/323

Primary Examiner—Howard B. Blankenship
Attorney, Agent, or Firm—Kenneth Q. Lao

[57] ABSTRACT

A dual-lens camera which can be used to take single-frame images for 2D photography or dual-frame images for 3D photography. The camera has two taking lenses and two independently operable shutters. The unique feature of this dual-lens camera is that the camera comprises two shutter release buttons. On release button activates only the shutter associated with one taking lens to take a single-frame image. The other button activates both shutters to take a stereo image pair. A film advance mechanism is used to advance the film in accordance with the operating mode of the camera.

6 Claims, 2 Drawing Sheets

DUAL-LENS CAMERA WITH SHUTTERS FOR TAKING DUAL OR SINGLE IMAGES

BACKGROUND OF THE INVENTION

Multiple-lens cameras have been, for years, used to take 3D pictures. Existing multiple-lens cameras are designed to be used with 35 mm film such that each image frame is about 17 mm wide, or half that of a full-frame taken by a regular 35 mm camera. One of the disadvantages of this type of multiple-lens camera is that they cannot be used as a 2D camera to take single frame images. Furthermore while the image format is suitable for making 3D pictures, it is somewhat narrow for producing 2D pictures usually demanded by the consumer. U.S. Pat. No. 5,465,128 (Wah Lo et al.) discloses a multiple-lens camera wherein the image frame behind one of the lenses is wider than the other image frames. The wider image can be a full-frame and it can be used to produce regular 2D pictures. One of the disadvantages of this type of camera is that it cannot be used as a 2D camera to take single-frame images to save film. U.S. Pat. No. 5,294,951 (Lo) discloses a dual-mode camera wherein movable baffles are used to section off the film plane behind the lenses into three half-frames when the camera is used to take 3D pictures, and to block off the two side lenses when the camera is used to take 2D pictures. The disadvantage of this type of camera is that it uses complex mechanism to convert the camera between 2D and 3D modes.

It is advantageous to provide a simple and inexpensive dual-mode camera that can be used to take 2D pictures in single frames and 3D pictures in multiple-frames.

SUMMARY OF THE INVENTION

It is an objective of the present invention to provide a dual-mode camera which can take both single-frame pictures and stereo-image pairs.

It is another objective of the present invention to provide a dual-mode camera wherein the single-frame image is a full frame for making regular 2D pictures.

It is yet another objective of the present invention to provide a dual-mode camera which advances the film according to the number of image frames taken at a time.

It is still another objective of the present invention to provide a dual-mode camera which is simple to use.

The above objectives can be achieved by providing a dual-mode camera which has two taking lenses wherein at least one of the lenses is used to take a full frame image. The camera comprises two independently operable shutters each associated with a taking lens, and two shutter release buttons. One release button is used to activate only one shutter for taking 2D pictures. The other release button is used to simultaneously activate both shutters for taking a pair of stereo-images With two shutter release buttons, the consumer can take 2D pictures or 3D pictures simply by choosing the right button to push. The consumer does not need to move a switch or turn a knob to change the mode of the camera. The camera further comprises an automatic film advance mechanism which advances the film to move away the exposed film according to the taking picture modes. When the camera is used to take a single frame, the film is advanced just enough to move away the single exposed frame. But when the camera is used to take two image frames, the film is advanced to move away two exposed frames from the exposing area behind the lenses.

It is preferred that the image frame behind each taking lens is a full-frame so that the negatives can be printed out by a standard commercial 2D photographic printer. The stereoimage pairs, after being printed into 2D photographs, can be used for stereo viewing. But the stereo-image pairs can also be used to make 3D pictures.

The objectives of the present invention can be readily understood upon reading the description of the drawing figures.

DETAILED DESCRIPTION OF THE PREFERRED EMBODIMENT

Figure 1:
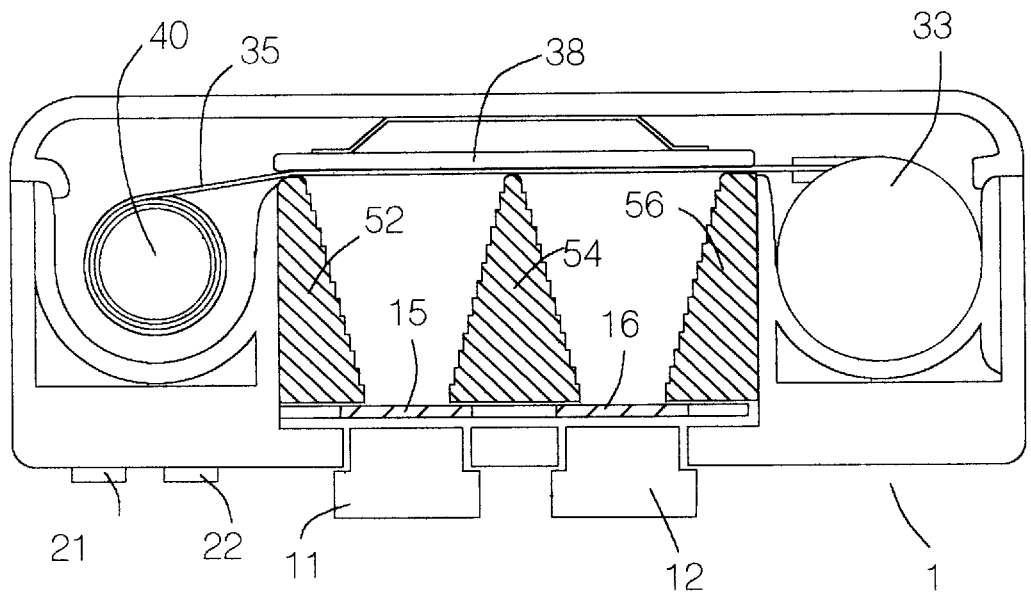
FIG. 1 shows the schematic of the dual-lens camera, according to the present invention.

FIG. 1 illustrated a dual-lens camera, according to the preferred embodiment of the present invention. In FIG. 1, the camera 1 comprises two taking lenses 11 and 12, and two shutters 15 and 16 associated with the taking lenses. Behind the shutters are a group of baffles 52, 54 and 56 to form light-tight chambers and to define the image frames on the film plane in front of a pressure plate 38. The film, denoted by numeral 35, is fed from a film magazine 33 and took up by a film advance mechanism 40. Preferably, the width of the image frame behind the taking lens 11, as defined by baffles 52 and 54, is about 35 mm so that the image formed by the taking lens 11 is a full-frame, a standard format for 35 mm cameras in regular 2D photography. However, the image frame behind the taking lens 11 can also be designed to have a width between 33 mm to 38 mm. The width of the image frame behind the taking lens 12, as defined by baffles 54 and 56, can be equal to the width of the image frame behind the taking lens 11. In that case, the separation between the two taking lenses is about 34 mm to 39 mm. But the image frame behind the taking lens 12 can also be smaller than the image frame behind the taking lens.

The unique feature of this camera is the two shutter release buttons 21 and 22. When the shutter release button 21 is pushed to take picture, only shutter 15 is activated to effect the exposure of an image formed by taking lens 11 onto the film 35. It is followed that the film advance mechanism advances the film by a length which is a few millimeters greater than the image frame behind the taking lens 11, to move the exposed section of the film away from the exposing area behind taking lens 11. When the shutter release button 22 is pushed to take picture, both shutter 15 and shutter 16 are simultaneously activated to effect the exposure of two images formed by the taking lenses 11 and 12 onto the film 35. It is followed that the film advance mechanism advances the film by a length which is a few millimeters greater than to the total width of the image frames behind both taking lenses. With two simple shutter release buttons on the camera, the consumer can choose to take a single-frame image for 2D photography or a stereo-pair of images for 3D photography.

Figure 2:
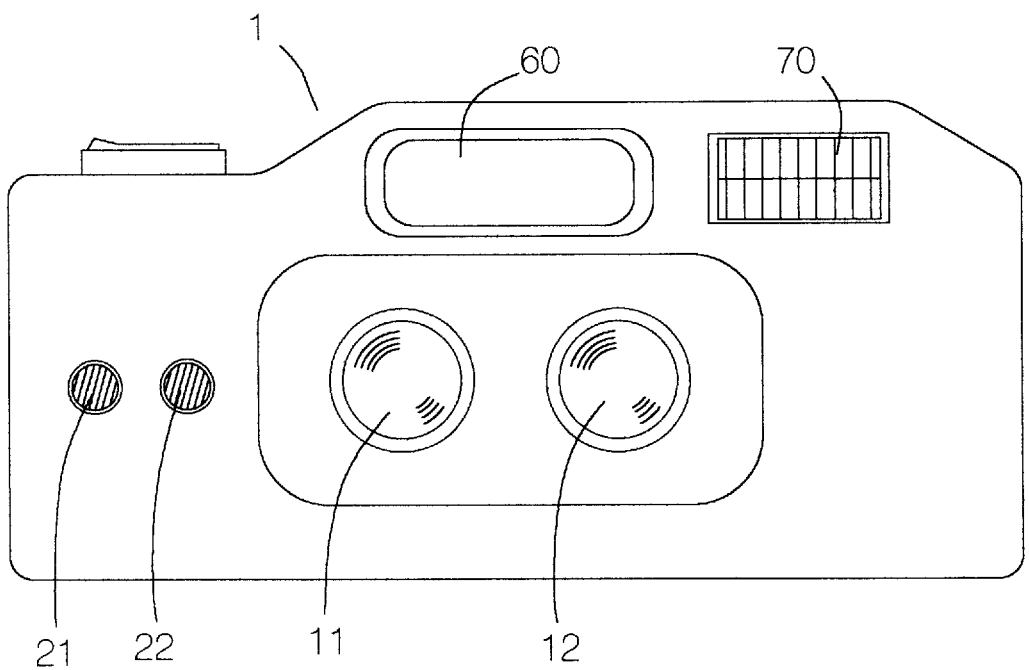
FIG. 2 shows the front view of the camera.

FIG. 2 shows the front view of the dual-lens camera. As shown in FIG. 2, the camera further comprises a view-finder 60 to show the field of view of the taking lenses. Preferably, the camera is equipped with an electronic flash 70 to provide adequate lighting when needed.

Figure 3:
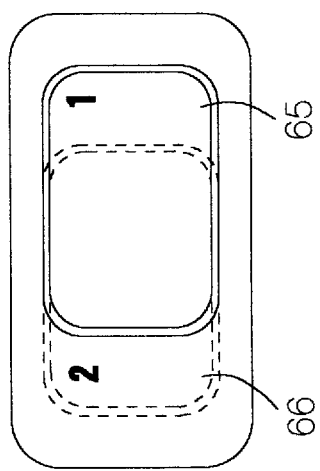
FIG. 3 shows the markings inside the view-finder of the camera.

FIG.3 shows the markers inside the view-finder of the dual-lens camera. It is preferred that two marking frames be provided inside the view-finder 60 to show the field of view of the taking lenses. The frame 65 is designed to show the field of view of the taking lens 11 (FIG. 1) when the camera is used to take a single-frame 2D photography. The frame 66 shows the field of view shared by both taking lenses 11 and 12 (FIG. 1) when the camera is used to simultaneously take a stereo image pair for 3D photography.

Figure 4:
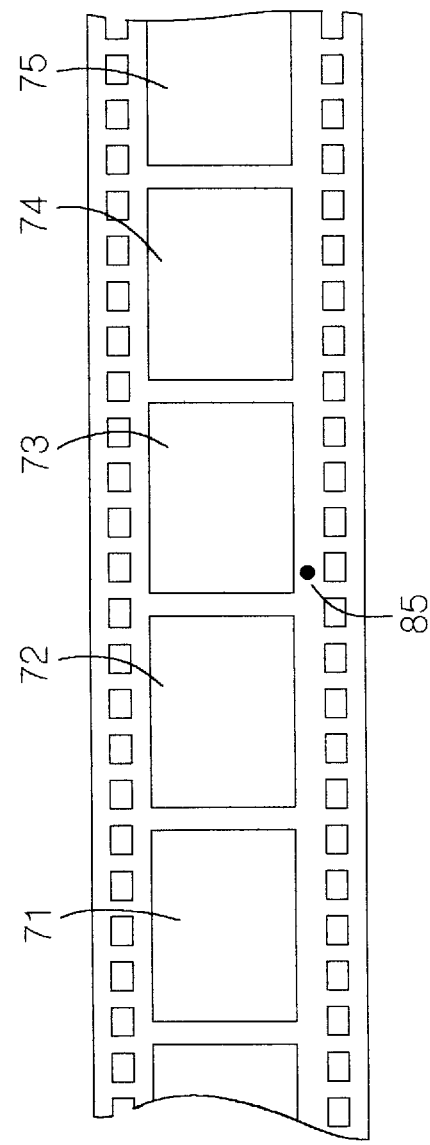
FIG. 4 shows a marking on the film to distinguish the operating modes of the camera.

FIG. 4 shows the markings on the film to distinguish the image frames intended for 3D photography from the other frames. When the image frames behind the two taking lenses are approximately the same size, it may be difficult to tell from the negatives whether the 2D mode or 3D mode is chosen when the pictures are taken. It is, therefore, useful to provide a marking on the film when the picture is taken. For example, it is possible to place a small light source such as an LED on the pressure plate to mark the image frame behind the taking lens 12 (FIG. 1), and the light source is turned on only when the camera is used for 3D photography. As shown in FIG. 4, a film strip having a plurality of image frames 71, 72, 73 and 74 taken by the dual-lens camera. Only frame 73 has a marking 85 which indicates that the image frames 72 and 73 are a stereo image pair for 3D photography. Image frames 71 and 74 are single-frame images for 2D photography. Of course, image frames 72 and 73 can also be used to make 2D pictures. It is understood that the marking shown in FIG. 4 is for illustrative purposes only, as a great variety of designs can be used as markings to distinguish one image frame from the other. Furthermore, the markings can be placed outside the image frames as shown, but they can also be placed within the image frames. Different markings can also be placed on both image frames of a stereo pair.

While the present invention has been disclosed in reference to the preferred embodiment, it shall be understood by those skilled in the art that various changes, modifications and substitutions may be incorporated into such embodiment without departing from the spirit of the invention as defined by the claims appearing hereafter.

What is claimed is:

1. A dual-lens camera for taking pictures and recording images on a roll of photographic film, said camera comprising:

a first taking lens having therebehind a first image frame to define an exposing area on said film; said first image frame having a width;

a first shutter associated with said first taking lens;

a first shutter release button for activating said first shutter to effect the exposure of an image formed by said first taking lens on said first image frame;

a second taking lens having therebehind a second image frame to define an exposing area on said film; said second image frame having a width;

a second shutter associated with said second taking lens;

a second shutter release button for simultaneously activating said first and second shutters to effect the exposure of two images formed by said first and second taking lenses on the respective image frames;

a film advance mechanism; said mechanism being caused by the action of the first shutter release button to advance said film by a length slightly greater than the width of said first image frame; said mechanism being caused by the action of the second shutter release button to advance said film by a length slightly greater than the total width of said first and second image frames; and a viewfinder.

2. The camera of claim 1 wherein the width of said second image frame is substantially equal to the width of said first image frame.

3. The camera of claim 1 wherein the width of said second image frame is smaller than the width of said first image frame.

4. The camera of claim 1 wherein the width of said first image frame ranges from 33 to 38 mm.

5. The camera of claim 1 wherein the viewfinder has therein a marking to indicate a field of view associated with said first taking lens.

6. The camera of claim 1 wherein the viewfinder has therein a marking to indicate a field of view associated with both the first taking lens and the second taking lens.

* * * * *